Sept. 3, 1968

T. A. STEHLIN 3,399,695

VALVE INCLUDING ELASTOMERIC BOOT WITH SEALING RING

Filed Nov. 25, 1966

INVENTOR.
THEODORE A. STEHLIN
BY
EDWARD D. O'BRIAN
ATTORNEY

United States Patent Office  
3,399,695  
Patented Sept. 3, 1968

3,399,695  
VALVE INCLUDING ELASTOMERIC BOOT WITH SEALING RING  
Theodore A. Stehlin, 54 Grace Walk, Pasadena, Calif. 91105  
Filed Nov. 25, 1966, Ser. No. 596,927  
8 Claims. (Cl. 137—551)

ABSTRACT OF THE DISCLOSURE

This invention is directed to a valve having an elastomeric boot. The boot has an outer flange which is clamped and sealed to the valve body. The boot is of one piece construction and extends around the valve disc. The boot seals against the valve seat in the closed position. By this construction, the moving parts are sealed from the valved fluid.

BRIEF SUMMARY

The valve of this invention is particularly suited to those conditions where leakage of the product handled outside of the valve, or contamination of the product handled by leakage into the valve is prevented. The valve has a seat and has a disc which moves into proximity with the seat when the valve is closed and moves out of such proximity when the valve is opened. Any conventional means can be used for disk movement with respect to the seat. Sealing is accomplished by a seal ring positioned upon the disc and which moves into sealing engagement with the seat. However, in addition to these conventional valving structures, the seal ring is formed as part of a boot. The boot covers the entire face of the disc and extends upward into the valve body. While the disc end of the boot, including the seal ring, moves with respect to the seat upon opening and closing of the valve, the body end of the boot is sealed in stationary relationship to the remainder of the body. By this means, a continuous seal provided by the boot which extends all the way across the face of the valve disc and up into the body and is sealed to the body. Thus, all operating mechanism for the valve disc is positioned within the boot and is excluded from communication with the fluid stream in the valve body. This eliminates the need for seals within the valve disc operating mechanism. Furthermore, only boot surfaces, which are easily cleaned, are positioned within the fluid stream. If desired, the boot can be convoluted for accordian folding, and preferably the valve disc is limited in extent of motion to motion which does not interfere with proper flexing of the boot. If desired, a vent from the interior of the boot to the exterior of the valve can be provided to indicate damage to the boot.

In the field of producing and handling food and medicines, it is highly desirable that equipment with which the sanitary material comes in contact be free of trapped chambers in which material can lodge. Many previous efforts have been made to design structures which eliminate such trap pockets. However, all previous valves required a sliding seal, which sliding seal prevented the material from entering into the operating mechanism in the valve body, or prevented it from escaping to the exterior from the valve body. Such sliding seals are quite effective, but are not completely tight, for a certain amount of fluid must be used to lubricate them. This lubrication requirement transmits both sanitary material from the interior of the valve and exterior contamination of the operating mechanism past the seal into the sanitary line. Such material movement is small, but it is desirably prohibited where the highest standards of cleanliness must be adhered to. The previous structures simply did not provide a moving disc valve wherein the disc was completely sealed away from the fluid passage by means of a static seal. Only static seals are capable of complete sealing.

An example of the prior structures which provide virtual complete sealing between the material being valved and the operating mechanism is found in Theodore A. Stehlin patent No. 3,062,496 granted November 6, 1962. This prior patent employs a boot to prevent contact between the valve disc and the fluid being valved. However, this prior boot employed a sliding seal between the boot and the valve body to thus have a point where material could pass between the line and the valve operating mechanism, but only in extremely small quantities. This prior valve is eminently satisfactory, but only in extremely small quantities. This prior valve is eminently satisfactory, but the valve of this invention provides complete sealing.

It is an object of this invention to provide a valve wherein the valve operating structure is completely sealed away from the fluid being controlled by the valve by means of a static seal. It is another object of this invention to provide a valve wherein a valve disc moves in association with a seat to selectively open and close the valve, and a boot extends over the valve disk, the boot completing the seal closure of the valve and extending to a point where it is statically sealed with respect to the body of the valve so as to provide a complete enclosure of the valve seat and its operating mechanism away from the fluid controlled by the valve. It is a further object of this invention to provide a completely sealed boot, which boot includes a seal ring which accomplishes the final closure of passage through the valve. It is a further object of this invention to provide an inexpensive valve which provides total sealing and separation between the fluid handled by the valve and the operating mechanism in the exterior of the valve so as to be eminently suitable for sanitary material valving. Other objects and advantages of this invention will become apparent from a study of the following portion of this specification, the claims and the attached drawings.

DESCRIPTION

Figure 1:
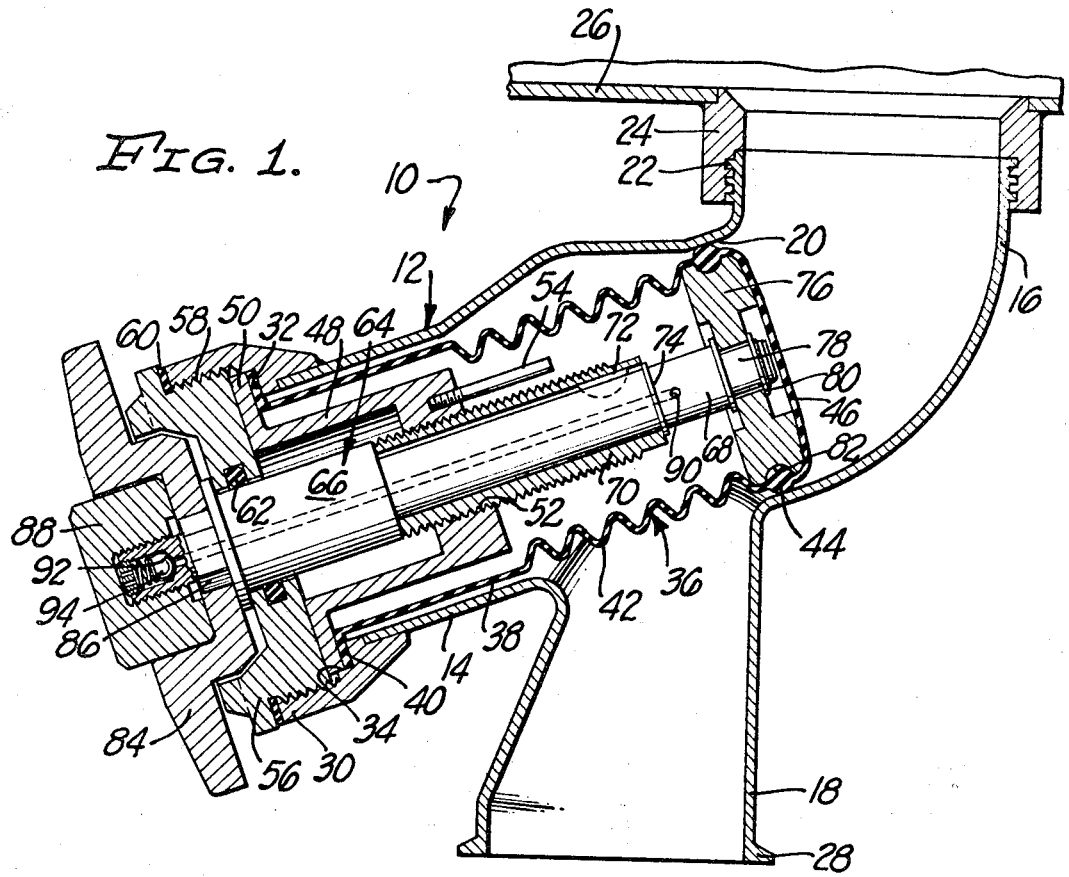
FIG. 1 is a longitudinal section taken through the valve of this invention.

Referring to the drawings, the valve of this invention is generally indicated at 10. The valve has a body 12, including a cylindrical valve body neck 14 which encloses much of the valve operating mechanism. Body 12 also has an inlet duct 16 and outlet duct 18. Separating inlet duct 16 and outlet duct 18 is cylindrical valve seat 20. Valving is accomplished at valve seat 20. Valve 10 is adapted to be connected to a conduit or vessel to valve the fluid flow therethrough or therefrom. For example, inlet duct 16 is provided with standard dairy threads 22. These threads adapt the valve to be connected to any piece of equipment having compatible threads. For example, it is screwed into nipple 24 which is welded into the bottom of vessel 26. Thus valve 10 acts as an outflow control for the contents of the vessel 26.

Outlet duct 18 similarly can be connected to any piece of equipment to which the valving of contents of vessel 26 is to be controlled. Flange 28 of a standard three piece fitting is shown. Similarly to the dairy threads 22, it is clear that ducts 16 and 18 can be provided with any convenient type of connection to associated equipment. The illustrated threads and flange are merely illustrative.

Furthermore, valve 10 is capable of controlling and stopping flow in the reverse direction, from duct 18 to duct 16. However, in this direction, the valve 10 does not have as high a pressure capability and therefore, it is preferably installed with the higher pressure upon duct 16.

Neck 14 of the body is formed around a central axis which passes through the center of cylindrical valve seat 20. Therefore, a valve disc movable along this axis is movable into and out of the area of cylindrical valve seat 20. Collar 30 is secured on the end of body neck 14. Collar 30 has therein an axial shoulder 32 and a radial shoulder 34. Boot 36 has a cylindrical upper section within body neck 14. The cylindrical upper section terminates in radial flange 40 which is positioned against both axial shoulder 32 and radial shoulder 34. It is thrust into sealing engagement therewith by means of further structure discussed below. Beyond the cylindrical upper section of boot 36 is convoluted section 42. The convolutions are either spiral in form or are arranged for accordian folding of the boot. Below the convoluted section, the boot has integrally formed therewith seal ring 44 which is adapted to be positioned in sealing engagement with valve seat 20. Face 46 extends across the end of the boot and is continuous thereacross from one side of seal ring 44 to the other. Boot 36 thus provides complete sealing between the structure positioned interiorly thereof and the structure positioned exteriorly thereof.

Nut 48 has a radially extending flange 50 which fits against flange 40 of boot 36 and is positioned by engagement with radial shoulder 34. Nut 48 has internal threads 52. If desired, nut 48 carries axial stop 54 which is of suitable length to limit the motion of the valve disc to a maximum open limit. This stop thus limits the amount of axial motion of the valve disc and thus limits the amount of flexure required of the convoluted section 42.

Positioned above nut 48 within collar 30 is gland member 56. Gland member 56 is threaded into collar 30 by means of threads 58 and is sealed with respect thereto by means of axial gasket 60. Gland member 56 screws down onto flange 50 to clamp radial flange 40 of boot 36 into sealing engagement with respect to collar 30. Thus, complete sealing between the material within the valve and the exterior of the valve is accomplished. Gland member 56 carries ring seal 62 interiorly thereof to seal against the exterior of valve stem 64.

Valve stem 64 has a major exterior cylindrical surface 66 which coacts with ring seal 62 for sealing. It also has smaller diameter 68 upon which thread sleeve 70 is located. Thread sleeve 70 is held from rotation by means of key 72 and is prevented from axial removal by means of snap ring 74. This construction permits quick replacement of thread sleeve 70 and nut 48 so that threads of different leads may be used, to change the valve from a slow operating, accurate adjusting valve to a quick operating valve.

Valve disc 76 is rotatably mounted on a reduced diameter 78 on the end of valve stem 64. It is prevented from leftward motion by means of shoulder on the valve stem and rightward motion by means of snap ring 80. Valve disc 76 is free to rotate on valve stem 64 to prevent windup or twisting of boot 36. Axial motion of valve stem 64, caused by rotation of the valve stem within nut 48 moves valve disc 76 axially from the position shown to a leftward position in FIG. 1 wherein there is free passage between the interiors of ducts 16 and 18. Valve disc 76 carries seal ring groove 82 to retain ring seal 44. Since the ring seal 44 is supported by this means, and is a pree fit within cylindrical valve seat 20, sealing is accomplished.

Hand wheel 84 is secured onto hexagonal extension 86 of valve stem 64 by means of nut 88. Nut 88 screws onto threads on the end of the valve stem to clamp hand wheel 84 in place. Thus, valve stem 64 can be manually rotated to move the valve disc 76 and its ring seal 44 into and out of sealing position. Axial stop 54 defines the maximum open position to both prevent excessive flexure of convolutions 42 and to limit the flow through the valve. For this latter purpose, axial stop 54 may be replaced by another axial stop of any desired length. A longer axial stop will permit only slight opening of the valve to thus limit the flow therethrough.

In view of the fact that boot 36 has its interior substantially closed off from the atmosphere by means of nut 48, trapped material on the inside of the boot may cause expansion thereof to thus prevent proper folding of the convolutions. In order to prevent this, the interior of boot 36 is vented to the atmosphere. Hole 90 is drilled through valve stem 64 to communicate from the interior of boot 36 to check valve seat 92 in the outer end of the valve stem. Check valve 94 is spring loaded against seat 92 to permit excessive pressure within the boot to escape to atmosphere, but to prevent flow from atmosphere into the interior of the boot. The passageway formed by hole 90 serves an additional purpose. Should boot 36 become punctured, fluid flow will become apparent at nut 88. This signals the need for boot replacement. However, should the system be operating with vacuum, it is undesirable for the atmosphere to pass the other way through the conduant formed by hole 90, for this would cause expansion of the boot. For this reason, check valve 94 is installed.

The material of boot 36 is necessarily elastomeric. The type of elastomer used is dictated by the esrvice conditions. In other words, for any particular fluid being handled, there is a most desirable elastomer. In some cases, a good grade of natural rubber is suggested. In others, synthetic rubber such as "neoprene" is suggested. In other cases, elastomeric versions of synthetic polymer composition materials which fall more into the class of "plastics" would be desirable. Any proper elastomer which meets the flexural and service condition is thus suitable. Since the valve is particularly suited to sanitary conditions, stainless steel is usually the most preferred material for body 12 and collar 30. These are the only two fixed portions of the valve which are in contact with the fluid. Thus, the remainder of the valve may be made out of any convenient materials, although in sanitary service the same material as the remainder of the valve is preferred.

Figure 2:
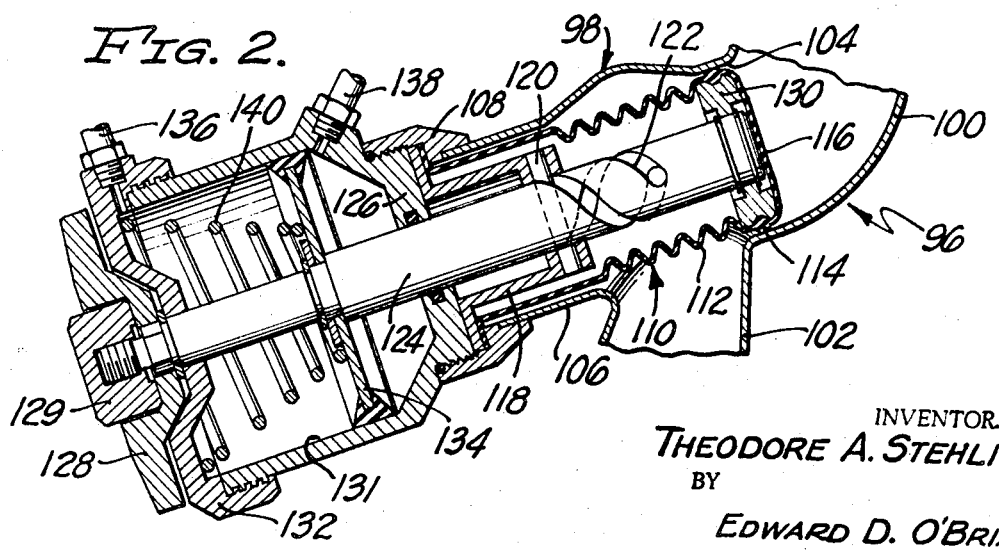
FIG. 2 is a further longitudinal section, on a reduced scale, taken through the valve of this invention showing the valve with a different operating mechanism.

Referring to FIG. 2, another embodiment of the valve of this invention is indicated therein at 96. Valve 96 is similar to valve 10, and illustrates a different operating mechanism for the valve of this invention. Valve 96 has body 98 which has inlet duct 100 and outlet duct 102. These ducts may be connected to adjacent equipment by any convenient means, similarly to the means indicated with respect to valve 10. Body 98 has a cylindrical valve seat area 104 and a body neck 106 to which the balance of the valve structure is secured.

Collar 108 is secured to neck 106. Collar 108 is identical to collar 30, so it is clear that either operating mechanism can be secured to either valve body, and the valve bodies are identical. Positioned within neck 106 and resting upon radial and axial surfaces of collar 108 is boot 110. Again, boot 110 is of elastomeric material of suitable nature for the fluid handled, and has convolutions 112 which permit axial flexure of the boot. Boot 110 extends forward from the convolutions and excludes seal ring 114 which is adapted to meet valve seat 104 in sealing engagement. Face 116 closes the front of the boot and extends across from one side of seal ring 114 to the other.

Similarly to valve 10, valve 96 includes nut 118, which is secured within collar 108 and acts against the radial flange on boot 110 to seal the boot with respect to collar 108. Nut 118 carries cross pin 120 which engages in spiral slot 122 in valve stem 124. Valve stem 124 is sealed with respect to collar 108 by means of gland member 126. The outer end of valve stem 124 carries hand wheel 128 which is held in place by means of nut 129. By rotation of hand wheel 128, valve stem 124 rotates within nut 118, so that interengagement of cross pin 120 with spiral slot 122, causes axial motion of the valve stem and movement of valve disc 130 and its seal ring 114 into and out of sealing engagement with valve seat 104. Thus, valve 96 can be manually actuated, and is of the "quick operating" type because of the long lead spiral as spiral slot 122. It is clear that such a spiral, quick acting structure can also be installed in valve 10.

In addition to the manual actuation of valve 96, cylinder actuation is provided. Cylinder 131 is formed on gland member 126 and is closed by cylinder cap 132. Piston 134 is located within cylinder 131 and is secured to valve stem 124. Conduits 136 and 138 are connected to the opposite sides of cylinder 131, as it is divided by piston 134. Thus, pressurization of conduit 136 and exhaust of conduit 138 causes closing of the valve by moving valve disc 130 into closed position with respect to seat 104. Similarly, pressurization of conduit 138 and exhaust of conduit 136 causes piston 134 to move to the left, drawing valve stem 124 to the left. The high spiral of slot 122 does not resist this motion, but causes rotation of the entire internal structure attached to valve stem 124, except for valve disc 130. The valve disc is freely rotatable upon the valve stem, in the manner previously described to prevent twisting of boot 110. Spring 140 is positioned within cylinder 131 and engaged upon piston 134 to urge it to the right. This spring is provided so that upon failure of pressure in the control system of conduits 136 and 138, the valve closes. If fail safe operation is not required, this spring is not required. Thus, valve 96 can be operated either by means of fluid operating in the cylinder 131, or manually. However, it is clear that the sealing of boot 110 completely seals the operating mechanism away from fluid stream by means of a static seal around the flange on the outer end of the boot. Thus, complete sealing is again accomplished.

This invention having been described in its preferred embodiment, it is clear that it is susceptible to numerous modifications and changes within the ability of those skilled in the art and without the exercise of the inventive faculty. Accordingly, the scope of this invention is defined by the scope of the following claims.

I claim:

1. A valve, said valve comprising a valve body, a seat within said valve body, inlet and outlet passages in said valve body, said valve seat defining the termination and juncture of said inlet and outlet passages;
   a neck on said valve body, a valve disc within said valve, said valve disc including a peripheral groove, a valve operating mechanism secured to said neck and attached to said disc to move said disc from a position adjacent said valve seat to a position away from said valve seat;
   a seal boot, said seal boot being in static seal engagement with respect to said valve body neck, said seal boot extending continuously from the portion of said sealed boot sealed with respect to said body neck continuously over said valve disk so as to separate said valve disk and said valve operating mechanism from said inlet and outlet passages, said seal boot including a seal ring, said seal ring engaging said valve seat to close said valve when said valve disc is adjacent said valve seat, said seal ring being partially seated within said peripheral groove so as to retain said seal ring in position with respect to said valve disc.

2. The valve of claim 1 wherein said seal ring extends exteriorly of said boot so that only said seal ring portion of said boot engages said seat when said valve is closed.

3. The valve of claim 1 wherein said seal boot is at least partially convoluted between said seal point of said seal boot with said body neck and said valve disc, said convolutions permitting motion of said valve disc toward and away from said valve seat without rupture of said seal boot.

4. The valve of claim 1 wherein said valve mechanism comprises a nut removably secured to said valve body neck, said nut engaging said boot and sealing said boot with respect to said valve body neck, a valve stem extending through said nut, motion control mechanism attached to said valve stem to control said motion of said valve stem, said valve disc being positioned upon the end of said valve stem, said valve disc moving said boot in and out of sealing relationship with respect to said valve seat by means of axial motion of said valve stem.

5. The valve of claim 4 wherein said motion control means comprises spiral faces upon said valve stem, said spiral faces engaging in cooperating means on said nut, a hand wheel secured to said valve stem, said valve disc being rotatably mounted upon said valve stem so that upon rotation of said hand wheel, said valve stem rotates within said nut and said spiral faces cause axial motion of said valve towards and away from said seat.

6. The valve of claim 5 wherein said spiral faces are positioned upon a thread sleeve, said spiral faces being threads upon said thread sleeve, said sleeve being mounted upon said valve stem in demountable relationship to said valve stem.

7. The valve of claim 5 wherein said nut carries a cross pin and wherein said spiral faces are in spiral slots in said valve stem, a cylinder mounted upon said valve body neck, a piston in said cylinder, said piston being mounted upon said valve stem, said valve operating mechanism being arranged so that upon the introduction of fluid under pressure into said cylinder, said valve stem is axially moved and said valve disc is moved away from said valve seat.

8. The valve of claim 1 wherein a passageway extends from the interior of said boot to a position exteriorly of said boot so as to permit the escape of pressurized fluid from within said boot.

References Cited

UNITED STATES PATENTS 3,062,496  11/1962  Stehlin _____ 251—357 X

FOREIGN PATENTS 743,622  12/1943  Germany.
826,226  12/1951  Germany.
564,895  7/1957  Italy.

ARNOLD ROSENTHAL, *Primary Examiner.*

UNITED STATES PATENT OFFICE
CERTIFICATE OF CORRECTION

Patent No. 3,399,695                                September 3, 1968

Theodore A. Stehlin

It is certified that error appears in the above identified patent and that said Letters Patent are hereby corrected as shown below:

Column 4, line 63, "excludes" should read -- includes --.
Column 6, line 20, "said motion" should read -- axial motion --; line 32, "said valve" should read -- said valve disc --.

Signed and sealed this 27th day of January 1970.

(SEAL)
Attest:

Edward M. Fletcher, Jr.
Attesting Officer

WILLIAM E. SCHUYLER, JR.
Commissioner of Patents